United States Patent
Shiraishi et al.

(10) Patent No.: US 10,230,250 B2
(45) Date of Patent: Mar. 12, 2019

(54) CHARGING APPARATUS, ELECTRICITY STORAGE SYSTEM, CHARGING METHOD AND PROGRAM

(71) Applicants: NEC Corporation, Tokyo (JP); NEC ENERGY DEVICES, LTD., Kanagawa (JP)

(72) Inventors: Shoichiro Shiraishi, Tokyo (JP); Takuya Hasegawa, Sagamihara (JP); Tomoyuki Ichikawa, Sagamihara (JP)

(73) Assignees: NEC Corporation, Tokyo (JP); NEC Energy Devices, Ltd., Sagamihara-shi, Kanagawa (JP)

( * ) Notice: Subject to any disclaimer, the term of this patent is extended or adjusted under 35 U.S.C. 154(b) by 190 days.

(21) Appl. No.: 15/033,616

(22) PCT Filed: Oct. 31, 2014

(86) PCT No.: PCT/JP2014/079029
§ 371 (c)(1),
(2) Date: Apr. 29, 2016

(87) PCT Pub. No.: WO2015/064735
PCT Pub. Date: May 7, 2015

(65) Prior Publication Data
US 2016/0301225 A1    Oct. 13, 2016

(30) Foreign Application Priority Data
Nov. 1, 2013   (JP) ................................ 2013-228669

(51) Int. Cl.
*H02J 7/00* (2006.01)
*H02J 7/04* (2006.01)
(Continued)

(52) U.S. Cl.
CPC ......... *H02J 7/0029* (2013.01); *H01M 10/443* (2013.01); *H01M 10/486* (2013.01);
(Continued)

(58) Field of Classification Search
USPC .......................................................... 320/107
See application file for complete search history.

(56) References Cited

U.S. PATENT DOCUMENTS

| | | |
|---|---|---|
| 5,703,466 A | 12/1997 | Honda et al. |
| 9,178,380 B2 | 11/2015 | Kawai et al. |

(Continued)

FOREIGN PATENT DOCUMENTS

| | | |
|---|---|---|
| JP | 5-336678 | 12/1993 |
| JP | 09-046916 | 2/1997 |

(Continued)

OTHER PUBLICATIONS

Notice of Ground of Rejection issued by the Japanese Patent Office in counterpart Japanese Patent Application No. 2015-545321, dated Apr. 11, 2017.

(Continued)

*Primary Examiner* — Robert Grant
(74) *Attorney, Agent, or Firm* — Finnegan, Henderson, Farabow, Garrett & Dunner, L.L.P.

(57) ABSTRACT

A charging apparatus comprises a charge control unit. The charge control unit charges a secondary battery at a first current value until the voltage of the secondary battery reaches a predetermined first voltage value. The charge control unit, on detecting that the voltage has reached the first voltage value, performs control to charge the secondary battery at a second current value that is lower than the first current value, until a predetermined second voltage value is reached.

18 Claims, 14 Drawing Sheets

(51) Int. Cl.
  *H01M 10/44* (2006.01)
  *H01M 10/48* (2006.01)
  *H01M 10/0525* (2010.01)

(52) U.S. Cl.
  CPC .............. *H02J 7/007* (2013.01); *H02J 7/045* (2013.01); *H02J 7/047* (2013.01); *H01M 10/0525* (2013.01); *H02J 2007/0037* (2013.01)

(56) References Cited

U.S. PATENT DOCUMENTS

| | | | |
|---|---|---|---|
| 2011/0181249 A1 | 7/2011 | Deguchi et al. | |
| 2011/0267001 A1* | 11/2011 | Hiraoka | H01M 10/0525 320/107 |
| 2011/0267009 A1* | 11/2011 | Nakatsuji | H01M 2/34 320/152 |
| 2013/0063079 A1 | 3/2013 | Kawai et al. | |
| 2013/0335034 A1 | 12/2013 | Suzuki et al. | |

FOREIGN PATENT DOCUMENTS

| | | |
|---|---|---|
| JP | 2008-220121 | 9/2008 |
| JP | 2009-22079 | 1/2009 |
| JP | 2011-4509 | 1/2011 |
| JP | 2013-62905 A | 4/2013 |
| WO | WO 2011/033704 A1 | 3/2011 |
| WO | WO 2012/005021 A1 | 1/2012 |
| WO | WO 2012/127775 A1 | 9/2012 |

OTHER PUBLICATIONS

International Search Report and Written Opinion dated Jan. 20, 2015, in corresponding PCT International Application.

Supplementary European Search Report issued by the European Patent Office in counterpart European Patent Application No. 14857288.6, dated Apr. 13, 2017.

* cited by examiner

CHARGING APPARATUS, ELECTRICITY STORAGE SYSTEM, CHARGING METHOD AND PROGRAM

TECHNICAL FIELD

Cross-Reference to Related Applications

This application is a National Stage Entry of International Application No. PCT/JP2014/079029, filed Oct. 31, 2014, which is based upon and claims the benefit of the priority of Japanese Patent Application No. 2013-228669, filed in Japan on Nov. 1, 2013. The entire contents of the above-reference application are expressly incorporated herein by reference. The present invention relates to a charging apparatus for charging a secondary battery. Further, the present invention relates to an electricity storage system provided with the charging apparatus. The present invention also relates to a charging method for charging a secondary battery. Moreover, the present invention relates to a program that operates the charging apparatus and to a program that controls the charging method.

BACKGROUND

A secondary battery (rechargeable battery) is used as a power supply in electric automobiles or mobile apparatuses such as a smart phone. A lithium-ion secondary battery, for example, is known as one of these secondary batteries.

When a secondary battery is charged, in order to prevent the occurrence of an accident or the shortening of battery life, measures are adopted to prevent overcharging (see Patent Literature 1).

A charging method for a lithium-ion secondary battery described in Patent Literature 1 is a method of charging a battery, which is a lithium-ion secondary battery, while comparing with a protection voltage (Vp) that varies with temperature, and of stopping charging when the battery voltage exceeds the protection voltage (Vp) and switching charging voltage (Vc) according to temperature zone to perform charging, wherein charging is started initially with the highest charging voltage (Vc), battery temperature and voltage are detected, charging is stopped when the battery voltage exceeds the protection voltage (Vp) of the temperature zone detected from the battery temperature, and when the charging is stopped and the voltage drops, constant voltage/constant current charging is performed at a charging voltage (Vc) corresponding to the battery temperature.
PTL 1:
Japanese Patent Kokai Publication No. JP2009-22079A

SUMMARY

The following analysis is given from a viewpoint of the present invention.

In charging a secondary battery, it may not be possible to ensure safety when charging at a constant current. For example, in a case of a lithium-ion battery, in a given temperature environment, on charging to a fully charged voltage with a current that enables charging in a short time, dangerous material such as metallic lithium or lithium compounds may cause deposition to easily occur on an anode. On the other hand, when charging is performed to fully charged voltage with a constant current enabling the avoidance of deposition of dangerous materials, the time until charging is completed is long. Accordingly, in the environment in question, a means is desired by which charging is completed safely and in a short time.

In the charging method described in Patent Literature 1, since charging at a constant current is only performed in a low temperature zone, with the charging method described in Patent Literature 1 it is not possible to implement charging that ensures both safety and high speed.

According to a first aspect of the present invention there is provided a charging apparatus comprising a charge control unit. The charge control unit charges a secondary battery at a first current value until the voltage of the secondary battery reaches a predetermined first voltage value. The charge control unit, on detecting that the voltage has reached the first voltage value, performs control to charge the secondary battery at a second current value that is lower than the first current value, until a predetermined second voltage value is reached.

According to a second aspect of the present invention there is provided a charging apparatus comprising a charge control unit. The charge control unit charges a secondary battery at a first current value until a battery capacity of the secondary battery reaches a predetermined first capacity value. The charge control unit, on detecting that the battery capacity has reached the first capacity value, performs control to charge the secondary battery at a second current value that is lower than the first current value, until a voltage of the secondary battery reaches a predetermined charging voltage value.

According to a third aspect of the present invention there is provided an electricity storage system comprising: the charging apparatus according to the first aspect; and the secondary battery that is connected to the charging apparatus.

According to a fourth aspect of the present invention there is provided a program that operates the charging apparatus according to the first aspect or second aspect.

According to a fifth aspect of the present invention there is provided a charging method comprising: charging a secondary battery at a first current value until voltage of the secondary battery reaches a predetermined first voltage value; and charging the secondary battery at a second current value that is lower than the first current value, until the voltage reaches a predetermined second voltage value from the first voltage value.

According to a sixth aspect of the present invention there is provided a charging method comprising: charging a secondary battery at a first current value until a battery capacity of the secondary battery reaches a predetermined first capacity value; and charging the secondary battery at a second current value that is lower than the first current value, until the voltage of the secondary battery reaches a predetermined second voltage value from a first voltage value of the secondary battery corresponding to a state where the battery capacity has reached the first capacity value.

According to a seventh aspect of the present invention there is provided a program to control the charging method according to the fifth aspect or sixth aspect.

The present invention provides various advantages, which include the following but not restricted thereto. It is possible to complete charging a secondary battery in a short time while ensuring safety.

PREFERRED MODES

Figure 1:
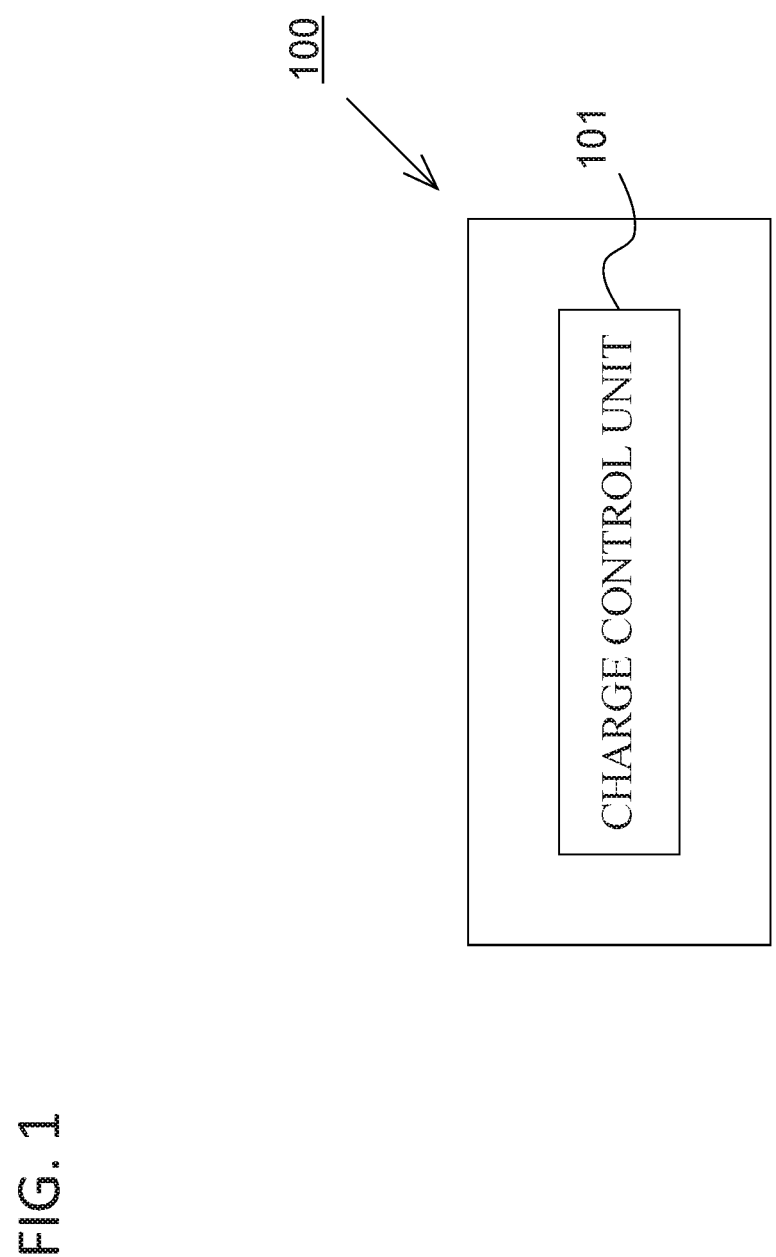
FIG. 1 is a schematic block diagram showing an example of a charging apparatus according to a first exemplary embodiment.

In the present disclosure there are various possible modes, which include the following, but not restricted thereto. In the following description, reference symbols in the drawings are attached for the purpose of aiding understanding, and are not intended to limit the invention to modes illustrated in the drawings. In each of the exemplary embodiments, the same symbols are attached to the same elements.

A description is given concerning a charging apparatus according to a first exemplary embodiment. FIG. 1 illustrates a schematic block diagram showing an example of a charging apparatus according to the first exemplary embodiment.

A charging apparatus 100 is a circuit for charging a secondary battery. A lithium-ion battery, for example, may be used as the secondary battery. Various forms of battery may be used as the lithium-ion battery. As cathode material, for example, it is possible to use a cobalt cathode that uses lithium cobalt oxide ($LiCoO_2$), a manganese cathode that uses lithium manganese oxide ($LiMn_2O_4$), or a nickel cathode that uses lithium nickel oxide ($LiNiO_2$). There is no limitation with regard to anode material, electrolyte material, and separator material. As anode material, for example, it is possible to use graphite. The secondary battery may be a single cell, or may be at least one battery pack in which a plurality of cells are connected in series so as to obtain a prescribed voltage. In a case where the secondary battery includes a plurality of battery packs, the plurality of battery packs may be connected in parallel, or may be connected in series. The secondary battery using the charging apparatus 100 is not limited to a lithium-ion battery. For example, the charging apparatus 100 may be applied to a nickel hydride battery that uses a hydrogen storing alloy. In each of the following exemplary embodiments, a description is given where charging of a lithium-ion battery is used as an example.

The charging apparatus 100 is provided with a charge control unit 101 that controls charging of the secondary battery.

Figure 2:
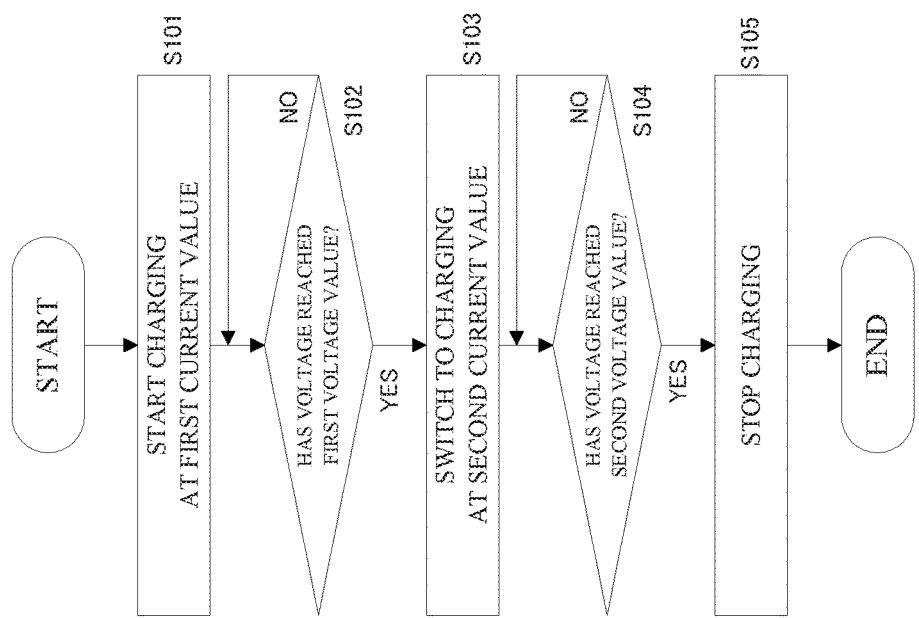
FIG. 2 is a flowchart for describing a method of operating the charging apparatus according to the first exemplary embodiment and charging a secondary battery, and a program that controls the method of operating the charging apparatus and performing charging.

A description is given of a method of operating the charging apparatus according to the first exemplary embodiment and charging the secondary battery, and of a program that operates the charging apparatus and a program that controls the method of charging. FIG. 2 is a flowchart for describing a method of operating the charging apparatus according to the first exemplary embodiment and charging the secondary battery, and of a program that operates the charging apparatus and a program that controls the method of charging.

The charge control unit 101 charges the secondary battery at a first current value (step S101; first constant current charging step). In response to detecting that the voltage of the secondary battery has reached a predetermined first voltage value, the charge control unit 101 switches to charging at a second current value lower than the first current value (step S103; second constant current charging step). In response to detecting that the voltage of the secondary battery has reached the second voltage value, the charge control unit 101 stops charging (steps S104 and S105).

The first current value and the second current value are preferably set so that the value of the first current value divided by the second current value (denoted as "current ratio") is not less than 1.2. The current ratio is preferably set to be not greater than 6.5. This is because if the first current value is too high, the risk of dangerous material being deposited becomes large. In particular in a case of charging in a low temperature environment, this risk is higher. This is because if the second current value is too low, the charging time becomes long. In addition, the higher the first current value in the first constant current charging step, the larger the voltage drop due to internal resistance, occurring when a switch is made from the first constant current charging step to the second constant current charging step. An equivalent to this voltage drop is compensated for in the second constant current charging step. However, when the voltage drop becomes large, the charging time of the second constant current charging step lengthens by an equivalent thereto. Therefore, the value of the first current value divided by the second current value is preferably set to the abovementioned range. The current ratio is more preferably not less than 1.5, more preferably not less than 2.3, and even more preferably not less than 2.7. The current ratio is more preferably not greater than 5.9, more preferably not greater than 5.4, and even more preferably not greater than 3.5. The current ratio can be calculated also from charging rate (as defined, for example, in the International Electrotechnical Commission (IEC) 61434; It).

The first current value, in a case of converting to a charging rate corresponding to charging current, is preferably a current value of not less than 0.1 It. This is in order to shorten the charging time. The first current value is a current value more preferably of not less than 0.2 It, and even more preferably not less than 0.25 It. The first current value is preferably a current value such that the charging rate is not greater than 0.6 It. This is in order to reduce the voltage drop. The first current value is preferably a current value such that the charging rate is more preferably not greater than 0.5 It, and even more preferably not greater than 0.4.

The second current value is preferably a current value such that the charging rate is not greater than 0.18 It. This is because in a low temperature environment, for example in an environment corresponding to a temperature zone of zero degrees Celsius or lower, in a case where the voltage of the secondary battery is high, if the charging current is high, the risk of dangerous material deposition becomes high. The second current value is more preferably a current value such that the charging rate is more preferably not greater than 0.15 It, and even more preferably not greater than 0.1 It. The second current value is preferably a current value such that the charging rate is not less than 0.04 It. This is because if the charging rate for the second current value is set too low, the charging time becomes long. The second current value is more preferably a current value such that the charging rate is more preferably not less than 0.05 It, and even more preferably not less than 0.06 It.

In a case where the secondary battery is a lithium-ion battery, the first voltage value is preferably set to not greater than 4.05 V. This is because in a low temperature environment (for example, less than zero degrees Celsius), on charging to a voltage exceeding 4.05 V with a high charging current, the risk of a dangerous material being deposited increases. The first voltage value is more preferably not greater than 4.04 V, and is more preferably not greater than 4.03 V. The first voltage value is preferably set to not less than 3.80 V. This is because if the first voltage value is set too low, the charging time becomes long. The first voltage value is more preferably not less than 3.85 V, and is more preferably not less than 3.90 V.

In a case where the secondary battery is a lithium-ion battery, the second voltage value is preferably set to not greater than 4.2 V. This is because in a low temperature environment (for example, less than zero degrees Celsius), on charging to the rated voltage, the risk of a dangerous material being deposited increases. The second voltage value is more preferably not greater than 4.15 V, and is more preferably not greater than 4.1 V.

In the first exemplary embodiment, the constant current charging step is divided into at least two stages. The current value in a second constant current charging step of a second stage is lower than the current value in a first constant current charging step of a first stage. By selecting a high current value in the first constant current charging step, it is possible to shorten the charging time. In the abovementioned description, an example of two stages is cited, but it is also possible to have three or more stages.

By not increasing the first current value too much, and, before the secondary battery reaches a voltage at which the risk of deposition of dangerous material becomes high at the first current value, by switching to the second constant current charging at the second current value that is lower than the first current value, it is possible to decrease the risk of dangerous material being deposited. In this way, even in charging at night during the winter in a cold region, it is possible to increase both safety and speed, in comparison to constant current charging of the first stage.

Figure 3:
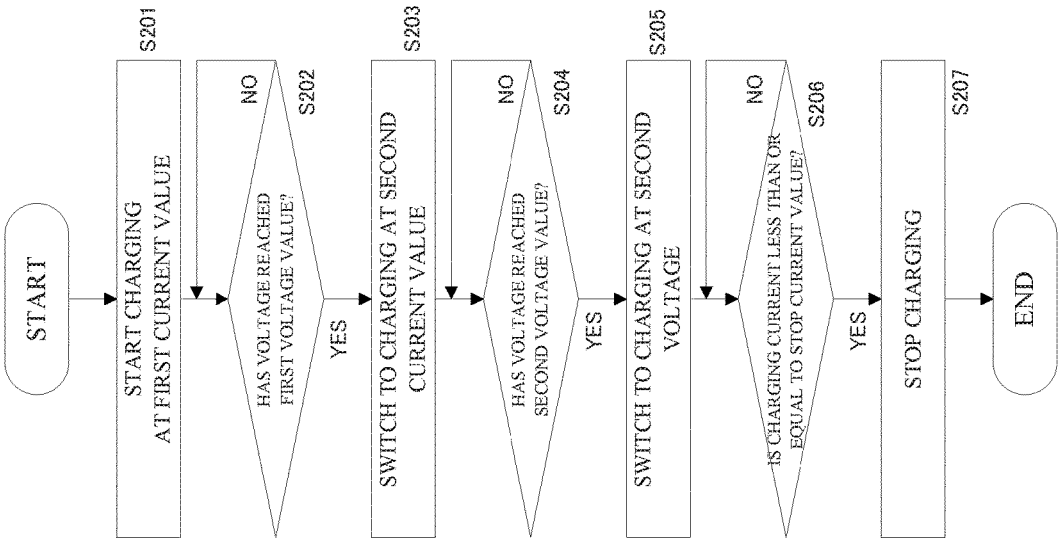
FIG. 3 is a flowchart for describing a method of operating the charging apparatus according to a second exemplary embodiment and charging a secondary battery, and a program that controls the method of operating the charging apparatus and performing charging.

Next, a description is given of a method of operating a charging apparatus according to a second exemplary embodiment and charging a secondary battery, and of a program that operates the charging apparatus and a program that controls a method of charging. FIG. 3 is a flowchart for describing the method of operating the charging apparatus according to the second exemplary embodiment and charging the secondary battery, and the program that operates the charging apparatus and the program that controls the method of charging. In the second exemplary embodiment, a constant voltage charging step is added to the first exemplary embodiment.

Steps S201 to S204 are the same as steps S101 to S104 in the first exemplary embodiment.

In response to detecting that the voltage of the secondary battery has reached the second voltage value, a charge control unit 101 performs charging at the second voltage value (step S205; constant voltage charging step). In response to detecting that the charging current has reached a predetermined current value, the charge control unit 101 stops charging (step S206 and S207).

According to the second exemplary embodiment, it is possible to further increase battery capacity.

Modes outside of those described above in the second exemplary embodiment are similar to the first exemplary embodiment.

Figure 4:
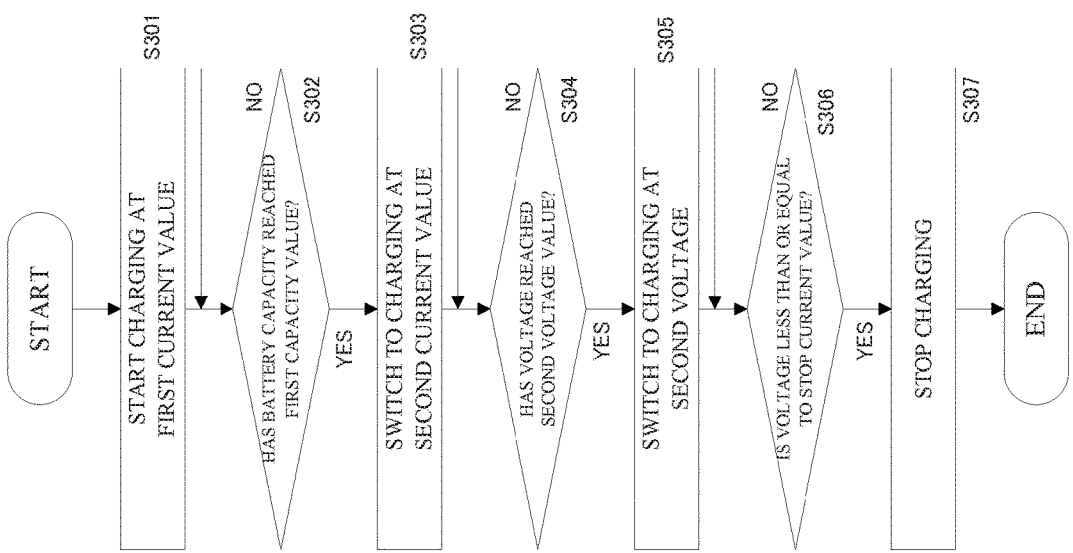
FIG. 4 is a flowchart for describing a method of operating the charging apparatus according to a third exemplary embodiment and charging a secondary battery, and a program that controls the method of operating the charging apparatus and performing charging.

Next, a description is given of a method of operating a charging apparatus according to a third exemplary embodiment and charging a secondary battery, and of a program that operates the charging apparatus and a program that controls the method of charging. FIG. 4 is a flowchart for describing the method of operating the charging apparatus according to the third exemplary embodiment and charging the secondary battery, and the program that controls the method of operating the charging apparatus and the program that controls the method of charging. In the first and second exemplary embodiments, a determination concerning switching from the first constant current charging step to the second constant current charging step is made according to whether the voltage of the secondary battery has reached a prescribed voltage value. In the third exemplary embodiment, a determination concerning switching from the first constant current charging step to the second constant current charging step is made according to whether the battery capacity of the secondary battery has reached a prescribed value.

Step S301 is the same as step S101 in the first exemplary embodiment.

In response to detecting that the battery capacity of the secondary battery has reached a predetermined first capacity value, the charge control unit 101 switches to charging at a second current value lower than the first current value (step S303; second constant current charging step).

Steps S303 to S307 are the same as steps S203 to S207 in the second exemplary embodiment.

The first current value and the second current value may be set similarly to the first exemplary embodiment.

The first capacity value is preferably not less than 20%. If the first capacity value is less than 20%, a long time is needed for the second constant current charging step. The first capacity value is preferably not greater than 67%. In a case where the first capacity value is larger than 67%, the risk of dangerous material being deposited in a low temperature environment becomes high. Therefore, by setting the first capacity value to the abovementioned range, it is possible to shorten the total charging time and also it is possible to ensure safety. The first capacity value is more preferably not less than 26%, is more preferably not less than 40%, and is even more preferably not less than 48%. The first capacity value is more preferably not greater than 64%, and is even more preferably not greater than 61%.

According to the third exemplary embodiment, an effect similar to the first exemplary embodiment can be obtained.

The third exemplary embodiment has been described based on the second exemplary embodiment, but the third exemplary embodiment can also be applied to the first exemplary embodiment. In such a case, it is possible to omit steps S305 and 306 in FIG. 4.

Modes outside of those described above in the third exemplary embodiment are similar to the first and second exemplary embodiments.

Figure 5:
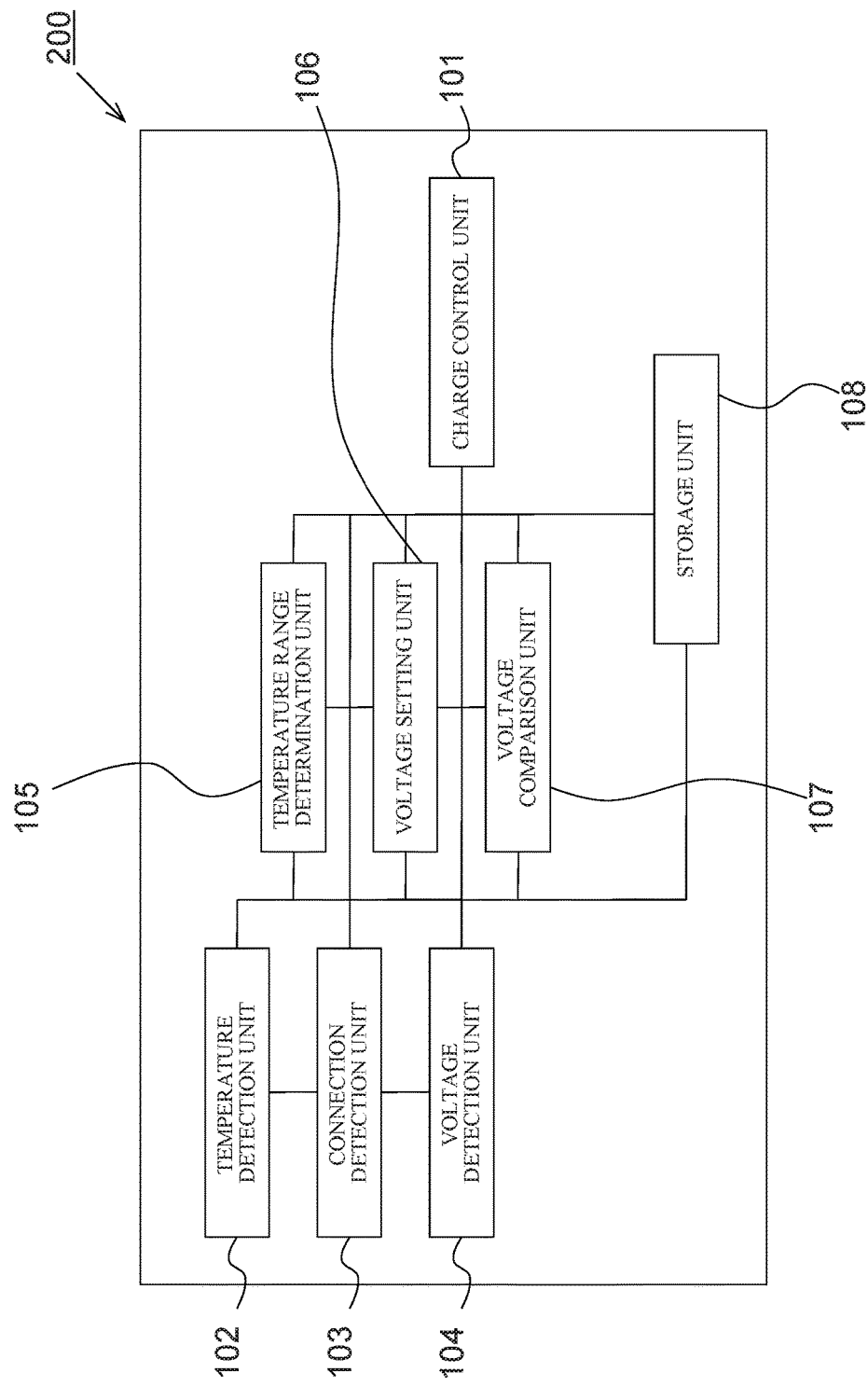
FIG. 5 is a schematic block diagram showing an example of a charging apparatus according to a fourth exemplary embodiment.

Next, a description is given concerning a charging apparatus according to a fourth exemplary embodiment. FIG. 5 is a schematic block diagram showing an example of a charging apparatus according to the fourth exemplary embodiment. The charging apparatus 200 according to the fourth exemplary embodiment is a more preferable mode of the charging apparatus according to the first exemplary embodiment.

The charging apparatus 200, in addition to the charge control unit 101 of the first exemplary embodiment, is further provided with: a temperature detection unit 102 that detects battery related temperature that relates to a secondary battery, a connection detection unit 103 that detects whether there is a connection between a charging power supply and the secondary battery, and a voltage detection unit 104 that detects the voltage of the secondary battery. The charging apparatus 200 is further provided with a voltage setting unit 106 that sets voltage related to charging control of the secondary battery, a temperature range determination unit 105 that determines the temperature range of the temperature detected by the temperature detection unit 102, a voltage comparison unit 107 that compares the size of the set voltage value and the voltage of the secondary battery, and a storage unit 108 that stores various types of data. The storage unit 108 stores, for example, an upper limit voltage value corresponding to temperature range, temperature range at a time of charging, charging current value for constant current charging, voltage value for constant voltage charging, charging completion current value for constant voltage charging, charging start voltage value, and the like. It is to be noted that the charging apparatus 200 need not be provided with all of the abovementioned units.

The connection detection unit 103 may be configured to output detected connection information to at least the temperature detection unit 102 and the voltage detection unit 104. The temperature detection unit 102 may be configured so as to detect battery related temperature, based on the connection information from the connection detection unit 103. The temperature detection unit 102 may be configured to output the detected temperature information to at least one among the temperature range determination unit 105, the charge control unit 101 and the voltage setting unit 106. The voltage detection unit 104 may be configured to detect the voltage of the secondary battery, based on the connection information from the connection detection unit 103. The voltage detection unit 104 may be configured to output the detected voltage information to at least the voltage comparison unit 107. The temperature range determination unit 105 may be configured to determine the temperature range of the battery related temperature, based on the temperature information from the temperature detection unit 102. The temperature range determination unit 105 may be configured to output the determined temperature range information to at least one among the charge control unit 101 and the voltage setting unit 106. The voltage setting unit 106 may be configured to set an upper limit to the voltage of the secondary battery, based on the temperature range information from the temperature range determination unit 105. The voltage setting unit 106 may be configured to output the set upper limit information to at least the charge control unit 101. The voltage comparison unit 107 may be configured to compare a set value and a voltage value, based on the voltage information from the voltage detection unit 104. The voltage comparison unit 107 may be configured to output comparison result information to at least the charge control unit 101. The charge control unit 101 may be configured to determine a charging method and to control charging of the secondary battery, based on at least one item of information from the abovementioned respective units.

The temperature detected by the temperature detection unit 102 is preferably the temperature of any part of the secondary battery. This is because, when charging of a lithium-ion battery is performed, the temperature of the secondary battery affects deposition of dangerous material such as lithium. When detecting the temperature of the secondary battery, it is possible to detect, for example, cell temperature, temperature between cells, temperature of a conductor that connects between cells, or the like. The temperature detected by the temperature detection unit 102 is not limited to the temperature of the secondary battery itself, and may be the temperature of the environment in which the secondary battery, the charging apparatus, or the electricity storage system described later is placed. This is because the environment temperature thereof greatly affects the temperature of the secondary battery. As the temperature environment in which the secondary battery, the charging apparatus, or the electricity storage system is placed, when a secondary battery is installed in an automobile for example, the air temperature in a garage, or outdoors where the automobile is located, may be cited. When a secondary battery is installed in a mobile apparatus, the air temperature to which the secondary battery or mobile apparatus is exposed may be cited, for example. The temperature detection unit 102 may detect the temperature of a plurality of places. In the following, the temperature detected by the temperature detection unit is denoted as "battery related temperature".

In each of the exemplary embodiments below, in order to ensure safety, the temperature range to which the battery related temperature belongs is divided into 2 or more regions, in accordance with the risk of dangerous material such as lithium being deposited. In the first to sixth exemplary embodiments, the temperature range is divided into a first temperature range and a second temperature range. The first temperature range and the second temperature range are preferably arranged to be adjacent. Boundaries of the temperature ranges may be arbitrarily set. For example, the boundary between the first temperature range and the second temperature range may be set such that, in the first temperature range, on charging with the same conditions as the second temperature range, an increase in the risk of dangerous material such as lithium being deposited is avoided. The upper limit of the secondary battery when charging is preferably set to a voltage value different from the first temperature range and the second temperature range. Here, the upper limit of the secondary battery when charging with regard to the first temperature range is denoted as a first voltage value, and the upper limit of the secondary battery when charging with regard to the second temperature range is denoted as a second voltage value. For example, the first temperature range may be set to include a region in which the battery related temperature is less than minus 10 degrees Celsius, and preferably, a region less than zero degrees Celsius. The second temperature range may be set to include a region of not less than 10 degrees Celsius, and preferably, a region of not less than zero degrees Celsius. In such a case, for example, the first voltage value may be set to within a range not less than 4.1 V and less than 4.15 V. The second voltage value may be set to a range not less than 4.15 V and not greater than 4.2 V.

Figure 6:
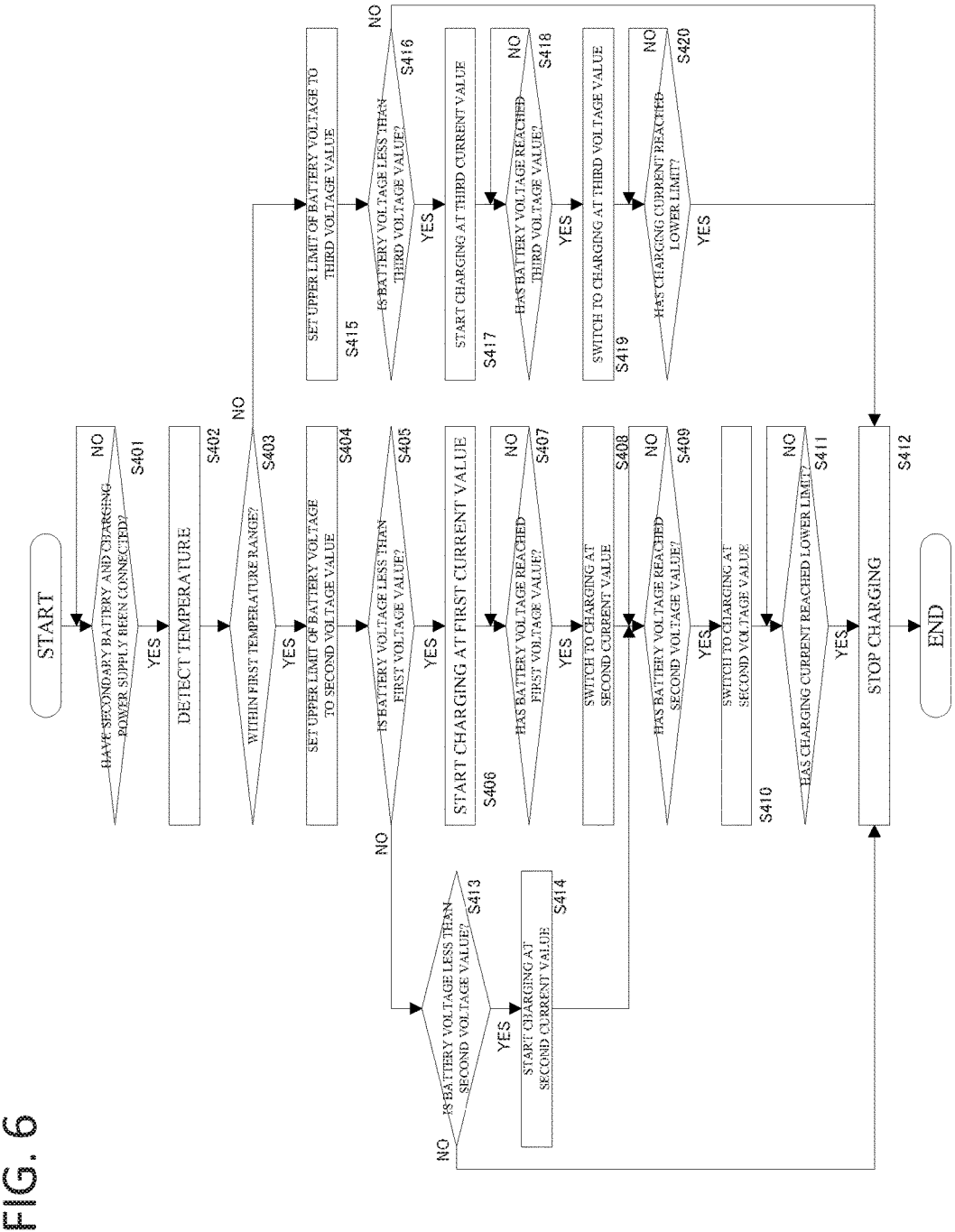
FIG. 6 is a flowchart for describing a method of operating the charging apparatus according to the fourth exemplary embodiment and charging a secondary battery, and a program that controls the method of operating the charging apparatus and performing charging.

Next, a description is given of a method of operating a charging apparatus according to the fourth exemplary embodiment and charging the secondary battery, and of a program that operates the charging apparatus and that controls the method of charging. FIG. 6 is a flowchart for describing the method of operating the charging apparatus according to the fourth exemplary embodiment and charging the secondary apparatus, and a program that controls the method of operating the charging apparatus and charging the secondary apparatus. Here, a description is given concerning a method of operating the charging apparatus according to the fourth exemplary embodiment and of charging based on the second exemplary embodiment, but the fourth exemplary embodiment may be applied also to the first exemplary embodiment and third exemplary embodiment.

First, the connection detection unit 103 detects whether the secondary battery and a power supply for charging are electrically connected (step S401). For example, in a case of the secondary battery being installed in an electric automobile, the connection detection unit 103 detects whether an in-vehicle charger and the charging power supply are connected. In a case of the secondary battery being installed in a mobile apparatus, the connection detection unit 103 detects whether a charger connected to a power supply and the mobile apparatus are connected. The connection detection unit 103 outputs the information concerning connection with the charging power supply to at least the temperature detection unit 102 and the voltage detection unit 104. The connection detection unit 103 may output connection information to other units.

Next, in response to connection information from the connection detection unit 103, the temperature detection unit 102 detects at least the battery related temperature after the connection has been confirmed (step S402). The temperature detection unit 102 outputs temperature information to at least one among the temperature range determination unit 105 and the voltage setting unit 106. It is to be noted that the temperature detection unit 102 may detect the temperature before connecting the secondary battery and the charging power supply. The temperature detection unit 102 may continue detecting the battery related temperature at time separated intervals, irrespective of whether charging is being performed or charging is stopped. In FIG. 6, temperature detection after step S402 is not shown.

Next, in response to temperature information from the connection detection unit 102, the temperature range determination unit 105 refers to the storage unit 108, and determines what temperature range the battery related temperature belongs to (step S403). The temperature range determination unit 105 may determine the temperature range at an instantaneous temperature, or may determine the temperature range based on the temperature of a fixed period or an average temperature. For example, the temperature range determination unit 105 may determine the temperature range based on one item of temperature information, or may determine the temperature range based on a plurality of items of temperature information in a prescribed period. The storage unit 108 has stored in advance correspondence relationships of temperature and temperature range. The temperature range determination unit 105 outputs the determined temperature range information to the voltage setting unit 106.

Next, in response to temperature range information from the temperature range determination unit 105, the voltage setting unit 106 refers to the storage unit 108 and sets an upper limit to the voltage of the secondary battery to a voltage value corresponding to the temperature range. The storage unit 108 has stored, in advance, correspondence relationships of temperature range and upper limit voltage. The voltage setting unit 106 sets an upper limit voltage to the second voltage value, in a case where the detected temperature belongs to the first temperature range (step S404). In a case where the detected temperature belongs to the second temperature range, the upper limit voltage is set to the third voltage value (step S415). The storage unit 108 stores the upper limit voltage value that has been set. The voltage setting unit 106 outputs the upper limit information that has been set, to the voltage comparison unit 107 and the charge control unit 101.

Next, the voltage detection unit 104 detects the voltage value of the secondary battery, in response to the connection information from the connection detection unit 103. The voltage detection unit 104 preferably detects battery voltage after connection with the charging power supply, at time separated intervals. The voltage detection unit 104 outputs the voltage value information of the secondary voltage that has been detected to the voltage comparison unit 107.

Next, the voltage comparison unit 107, in response to the voltage value information from the voltage detection unit 104, compares the battery voltage value and the set upper limit (steps S405 and S416). The voltage comparison unit 107 outputs comparison result information to the charge control unit 101.

In response to the comparison result information from the voltage comparison unit 107, in a case where the battery voltage value is lower than the upper limit, the charge control unit 101 starts charging the secondary battery. In a state where the battery related temperature belongs to the first temperature range, the charge control unit 101 performs charging at the first current value (step S406). In a state where the battery related temperature belongs to the second temperature range, the charge control unit 101 performs charging at the third current value (step S417). With regard to the third current value, it is possible to select a preferable numerical value as appropriate, in a range in which dangerous material is not deposited. For example, the third current value may be set higher than the first current value, in order to shorten charging time.

In response to temperature information from the temperature detection unit 102 or temperature range information from the temperature range determination unit 105, the charge control unit 101 may perform charging of the secondary battery, with the predetermined first voltage value or the third voltage value as an upper limit of the battery voltage.

Here, a description is given of an example in which the voltage value at which charging is started and the voltage upper limit are set to the same value. However, the charging start voltage value may also be set to a voltage value different from the upper limit. For example, the charging start voltage value is set to a voltage value lower than the second voltage value or the third voltage value, and the storage unit 108 stores the charging start voltage value. In this case, the voltage comparison unit 107 compares the battery voltage value and a charging start voltage value. The charge control unit 101 then starts charging in a case where the battery voltage value is less than the charging start voltage value. Even if the battery voltage value is less than the first voltage value and third voltage value, if not less than the charging start voltage value, the charge control unit 101 does not start charging.

It is to be noted that a voltage detection step and voltage comparison step may be implemented before a temperature detection step.

In a state where the battery related temperature belongs to the first temperature range, steps S406 to S412 are similar to steps S201 to S207 of the second exemplary embodiment.

In a state where the battery related temperature belongs to the second temperature range, steps S418 to S420 are similar to steps S409 to S412 outside of where the upper limit voltage value and the charging current value differ.

In a state where the battery related temperature belongs to the first temperature range, in a case where the battery voltage value is not less than the first voltage value, the charge control unit 101, in response to the comparison result information, starts charging of the secondary battery at the second current value (steps S413 and S414). The following is the same as steps S409 to S412.

According to the fourth exemplary embodiment, an effect similar to the first exemplary embodiment can be obtained. It is possible to further increase the battery capacity, in accordance with the state of the battery related temperature.

Modes outside of those described above in the fourth exemplary embodiment are similar to the first to third exemplary embodiments.

Figure 7:
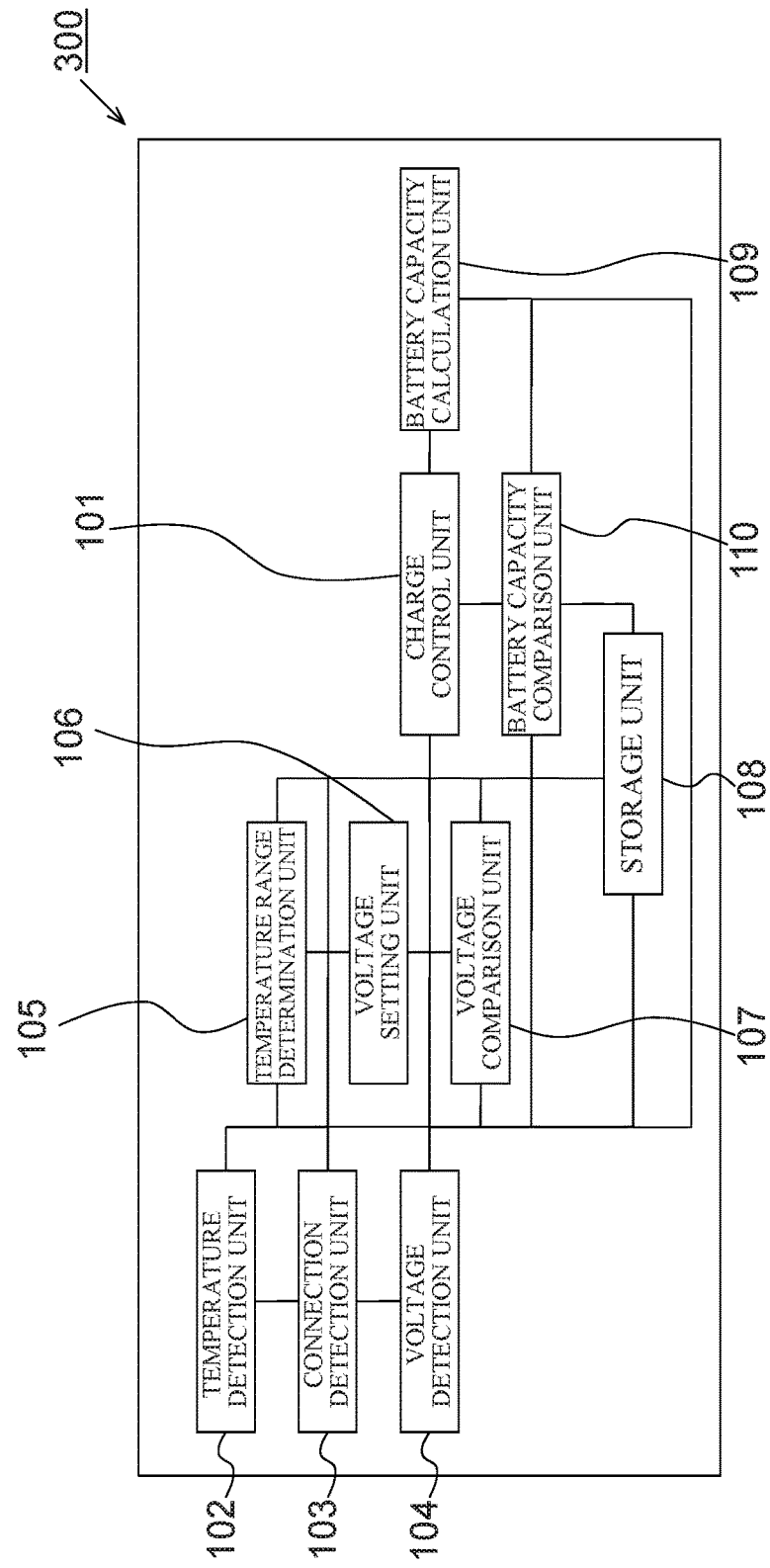
FIG. 7 is a schematic block diagram showing an example of a charging apparatus according to a fifth exemplary embodiment.

Next, a description is given concerning a charging apparatus according to a fifth exemplary embodiment. FIG. 7 is a schematic block diagram showing an example of the charging apparatus according to the fifth exemplary embodiment. A charging apparatus 300 according to the fifth exemplary embodiment is a more preferable mode of the charging apparatus according to the first exemplary embodiment.

The charging apparatus 300, in addition to the configuration of the fourth exemplary embodiment, is further provided with a battery capacity calculation unit 109 that calculates battery capacity of a secondary battery, and a battery capacity comparison unit 110 that compares the battery capacity value of the secondary battery and a predetermined first capacity value. A charge control unit 101 may be configured to output charging control information to the battery capacity calculation unit 109. Charging current value and charging time, for example, are cited as charging control information. A voltage detection unit 104 may be configured to output voltage information to the battery capacity calculation unit 109. The battery capacity calculation unit 109 may be configured to calculate the battery capacity of the secondary battery, based on the charging control information from the charge control unit 101 and the voltage information from the voltage detection unit 104. The battery capacity calculation unit 109 may be configured to output the battery capacity information to the battery capacity comparison unit 110. The battery capacity comparison unit 110 may be configured to compare a predetermined battery capacity standard of the secondary battery and the battery capacity of the secondary battery, based on the battery capacity information from the battery capacity calculation unit 109. The battery capacity comparison unit 110 may be configured to output comparison result information to the charge control unit 101. The battery capacity comparison unit 110 may be configured to output comparison result information to a voltage comparison unit 107. The charge control unit 101 may be configured to charge the secondary battery based on comparison result information from the battery capacity comparison unit 110.

Figure 8:
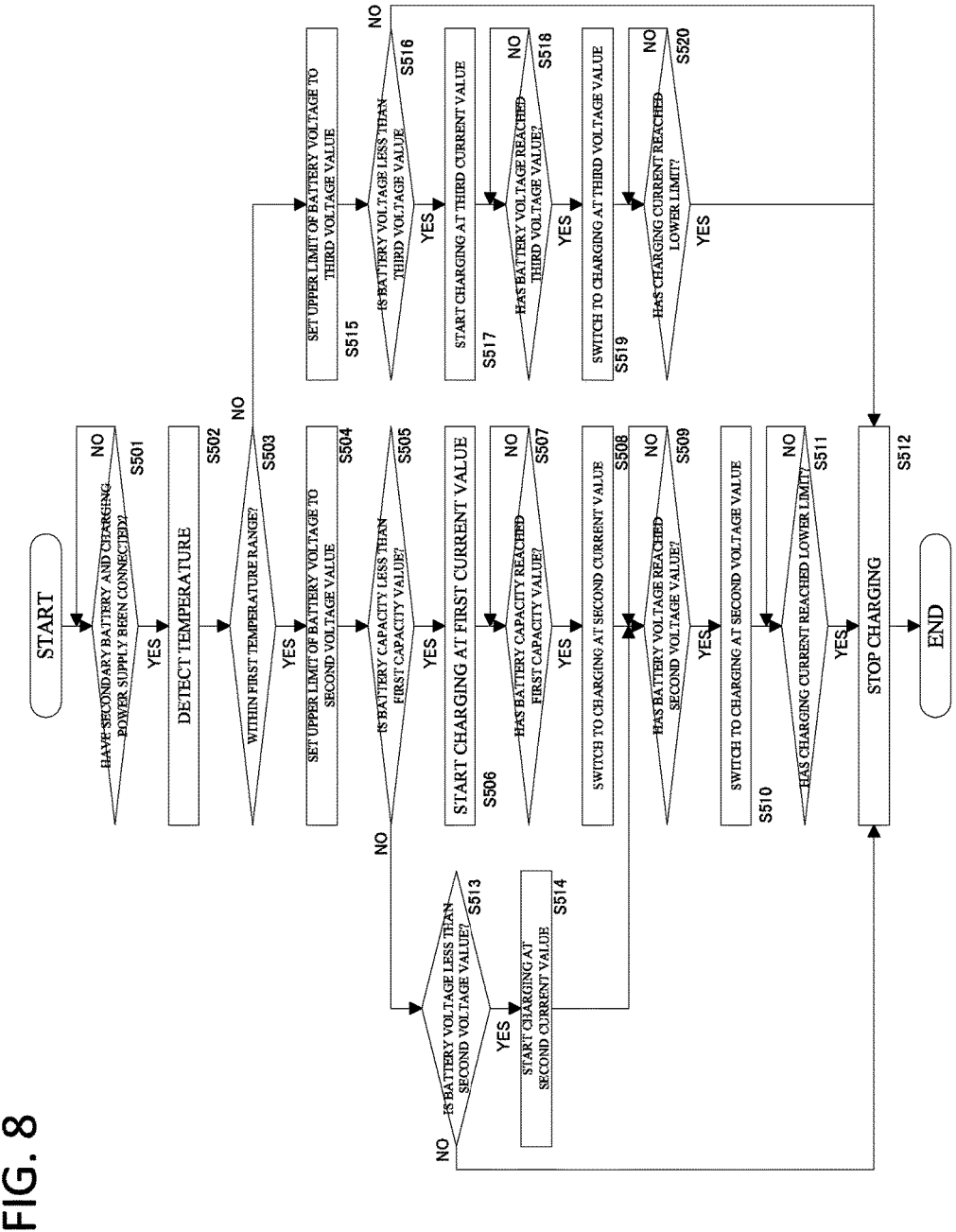
FIG. 8 is a flowchart for describing a method of operating the charging apparatus according to the fifth exemplary embodiment and charging a secondary battery, and a program that controls the method of operating the charging apparatus and performing charging.

Next, a description is given of a method of operating a charging apparatus according to a fifth exemplary embodiment and charging a secondary battery, and of a program that operates the charging apparatus and that controls the method of charging. FIG. 8 shows a flowchart for describing a method of operating the charging apparatus according to the fifth exemplary embodiment and charging the secondary battery, and a program that controls the method of operating the charging apparatus and performing charging. Here, a description is given concerning a method of operating the charging apparatus according to the fifth exemplary embodiment and performing charging, based on the third and fourth exemplary embodiments.

Steps S501 to S504 and steps S513 to S520 are similar to steps S401 to S404 and steps S413 to S420 in the fourth exemplary embodiment.

In a state in which the battery related temperature belongs to a first temperature range, a charge control unit 101 starts charging of the secondary battery in response to comparison result information from a battery capacity comparison unit 110. In a case where the capacity of the secondary battery is less than a predetermined first capacity value, the charge control unit 101 starts charging at a first current value (steps S505 and S506). Next, in a case where the battery capacity of the secondary battery has reached the first capacity value, the charging current is switched from the first current value to the second current value, in response to the comparison result information from the battery capacity comparison unit 110 (steps S507 and S508). Steps S508 to S512 are similar to steps S408 to S412 in the fourth exemplary embodiment.

It is to be noted that the calculation of the battery capacity by a battery capacity calculation unit 109 is not limited to before or after a temperature range determination by a temperature range determination unit 105.

In a state in which the battery related temperature belongs to a first temperature range, in a case where the capacity of the secondary battery is not less than a first capacity value, a voltage comparison unit 107 compares the voltage value of the secondary battery and a second voltage value, in response to comparison result information from the battery capacity comparison unit 110. Steps S513, S514 and S512 are similar to steps S413. S414 and S412 in the fourth exemplary embodiment.

According to the fifth exemplary embodiment, an effect similar to the first exemplary embodiment can be obtained. In accordance with the state of the battery related temperature, it is possible to further increase the battery capacity.

Modes outside of those described above in the fifth exemplary embodiment are similar to the first to fourth exemplary embodiments.

Figure 9:
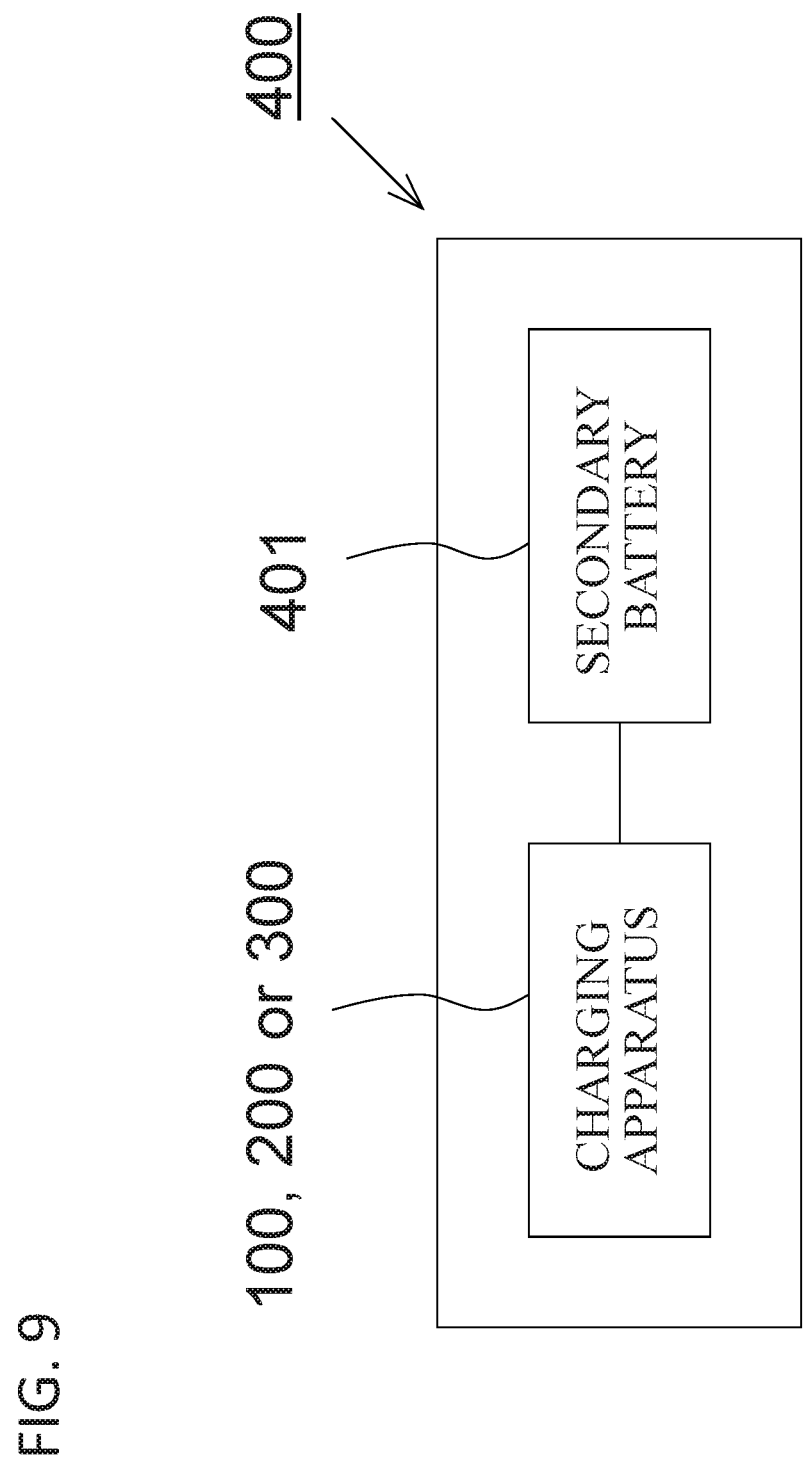
FIG. 9 is a schematic block diagram showing an example of an electricity storage system according to a sixth exemplary embodiment.

A description is given concerning an electricity storage system according to a sixth exemplary embodiment. FIG. 9 is a schematic diagram showing an example of an electricity storage system according to the sixth exemplary embodiment.

An electricity storage system 400 is provided with a secondary battery 401 that comprises at least one cell, and at least one among the charging apparatuses 100, 200 and 300 according to the abovementioned exemplary embodiments, connected to the secondary battery 401. A charging power supply is detachably connected to the charging apparatus(s) 100, 200, 300. The charging apparatus(s) 100, 200, 300 perform charging of the secondary battery 401.

A charging method by the electricity storage system 400 is similar to the charging methods described above.

According to the sixth exemplary embodiment, an effect similar to the first exemplary embodiment can be obtained.

Figure 10:
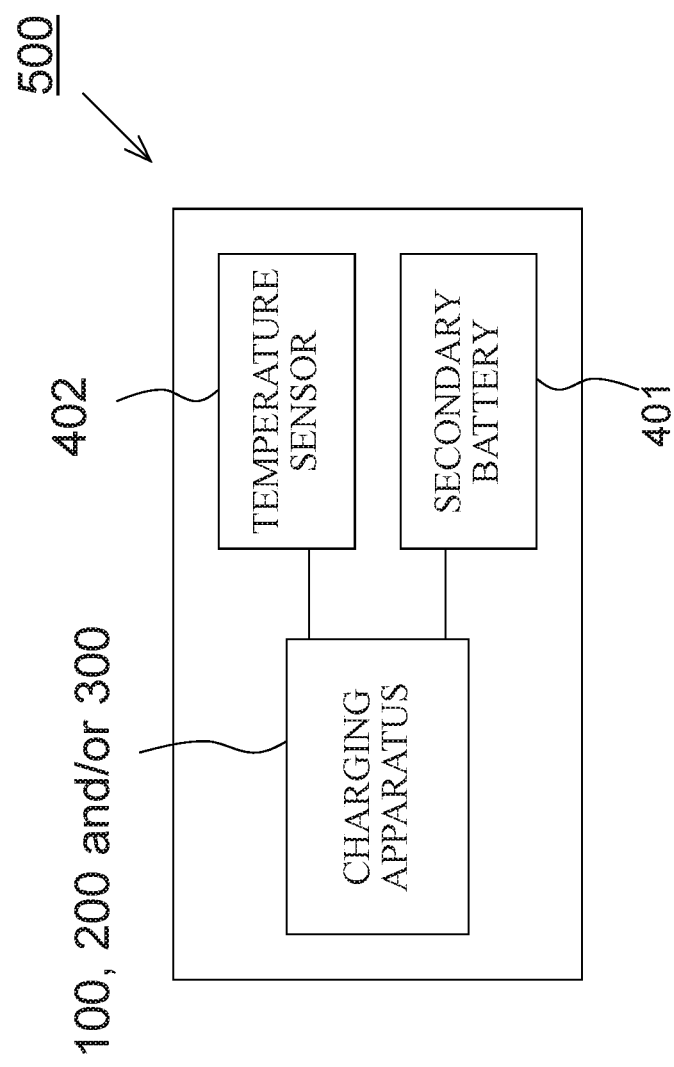
FIG. 10 is a schematic block diagram showing an example of an electricity storage system according to a seventh exemplary embodiment.

Next, a description is given concerning an electricity storage system according to a seventh exemplary embodiment. FIG. 10 is a schematic diagram showing an example of an electricity storage system according to the seventh exemplary embodiment.

The electricity storage system 500 is provided with a temperature sensor 402 connected to charging apparatus(s) 100, 200, and 300, in addition to the electricity storage system according to the sixth exemplary embodiment. The temperature sensor 402 is a sensor that detects battery related temperature as described above. The temperature sensor 402, for example, may be arranged so as to detect at least one temperature among a cell surface, between cells, and a conductor connected to a cell. The temperature sensor 402, for example, may be arranged so as to detect the temperature of the environment in which a secondary battery 401, charging apparatus(s) 100, 200, and 300 or the electricity storage system 500 is placed. A plurality of the temperature sensors 402 may be arranged so as to detect the temperature at a plurality of places.

A charging method by the electricity storage system 500 is similar to the charging methods described above.

The electricity storage system 500 may be applied to an exemplary embodiment requiring temperature determination. According to a seventh exemplary embodiment, an effect similar to the first exemplary embodiment can be obtained. According to the seventh exemplary embodiment, it is possible to perform charging in accordance with battery related temperature. For example, it is possible to perform charging while ensuring safety, in accordance with battery related temperature, and also it is possible to perform charging up to a suitable voltage value.

Figure 11:
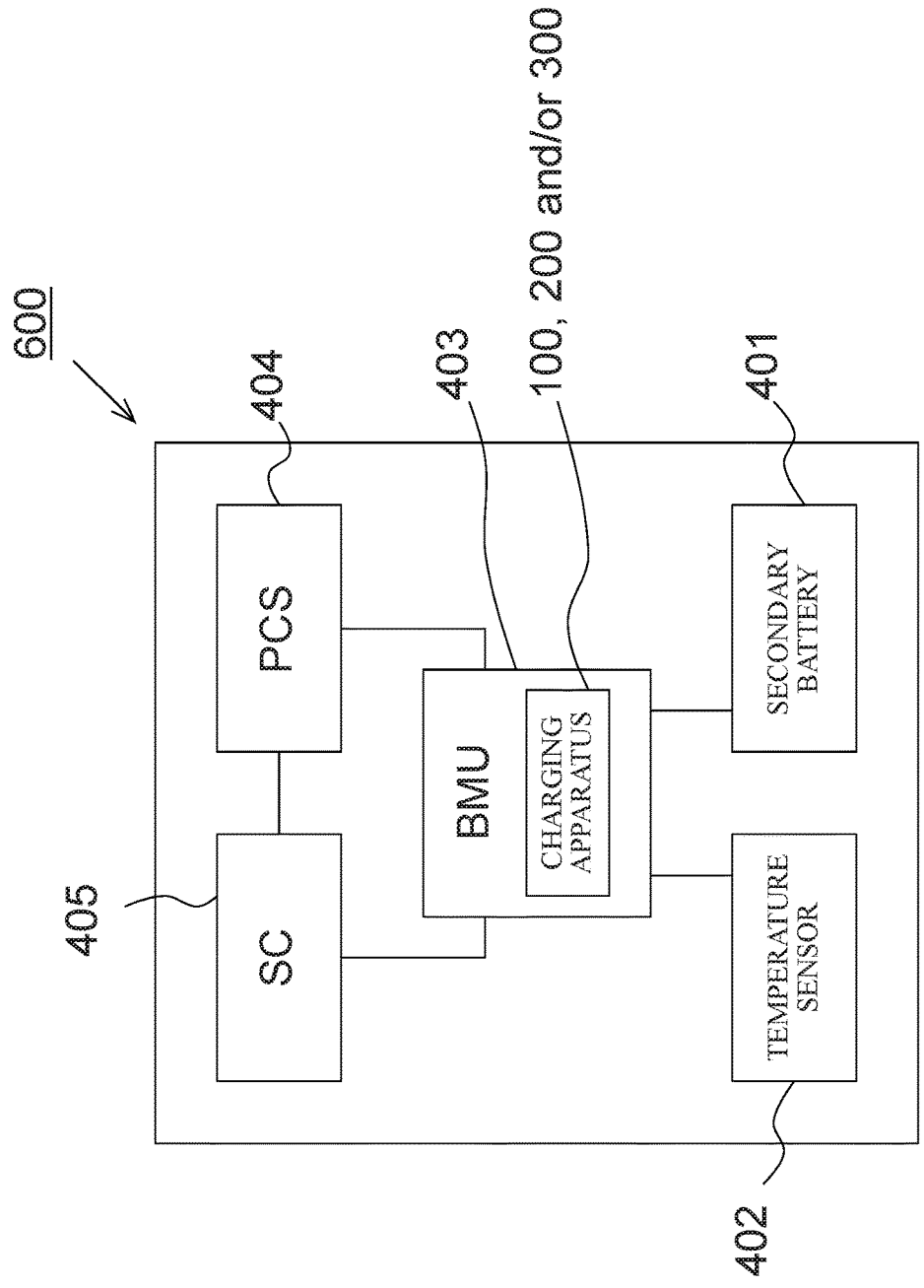
FIG. 11 is a schematic block diagram showing an example of an electricity storage system according to an eighth exemplary embodiment.

A description is given concerning an electricity storage system according to an eighth exemplary embodiment. FIG. 11 is a schematic diagram showing an example of an electricity storage system according to the eighth exemplary embodiment. The electricity storage system 600 according to the eighth exemplary embodiment is a preferable mode of the electricity storage system according to the seventh exemplary embodiment. The electricity storage system 600 is based on the seventh exemplary embodiment, but may also be based on the sixth exemplary embodiment. In such a case, the electricity storage system need not be provided with a temperature sensor.

The electricity storage system 600 is provided with: a secondary battery 401 including at least one cell; a battery management unit (BMU) 403 that performs charging control and discharging control of the secondary battery 401 and protection management of the secondary battery 401; a power conditioner system (PCS) 404 that performs conversion between DC power and AC power between the secondary battery 401 and a power supply or load, or voltage or frequency adjustment; and a system controller (SC) 405 that performs control and monitoring of the BMU 403 and PCS. The BMU 403, PCS 404 and SC 405 are connected to enable mutual communication. A charging power supply is connected to the PCS 404. In FIG. 11, the PCS and SC are illustrated as separate elements, but the mode illustrated in the drawing also includes a mode in which the PCS and CS are incorporated in one element.

The charging apparatuses 100, 200 according to the abovementioned exemplary embodiments are incorporated into the BMU 403. The secondary battery 401 and the temperature sensor 402 are connected to the charging apparatuses 100, 200.

A program may be incorporated in the SC 405, for example. The program executes each step of the operations of respective parts and the charging method described above in the charging apparatus.

Modes outside of those described above in the eighth exemplary embodiment are similar to the seventh exemplary embodiment.

According to the eighth exemplary embodiment, an effect similar to the seventh exemplary embodiment can be obtained.

The program can implement the operations of each unit and each step in each of the abovementioned exemplary embodiments by respective processes of the program.

EXAMPLES

A lithium-ion battery was manufactured, charging was performed by a charging apparatus and charging method according to the second exemplary embodiment, required charging time was measured, and presence or absence of deposition of dangerous material was confirmed.

<Fabrication of Cathode Electrode>

A description is given concerning fabrication of a cathode electrode. A mixture is made of $LiMn_2O_4$ at 85% mass, acetylene black at 7% mass as conductive auxiliary material, and polyvinylidene fluoride at 8% mass as binder. N-methylpyrrolidone is added to this mixture and mixed, to prepare cathode slurry. Using the doctor blade method, this is coated such that after roll press processing of both surfaces of Al foil of 20 μm thickness, forming a current collector, the thickness becomes 160 μm, and after undergoing drying/press processing for 5 minutes at 120 degrees Celsius, a cathode active material 2-surface coated part is formed. It is to be noted that a cathode active material non-coated part is provided where cathode active material is not coated on either surface at one end of the cathode.

<Fabrication of Anode Electrode>

A description is given concerning fabrication of an anode electrode. A mixture is made of graphite at 90% mass, acetylene black at 1% mass as conductive agent, and polyvinylidene fluoride at 9% mass as binder. N-methylpyrrolidone is added to this mixture and further mixing performed, to prepare anode slurry. By coating this such that after roll press processing of both surfaces of Cu foil of 10 μm thickness, forming a current collector, the thickness becomes 120 μm, and after undergoing drying/press processing for 5 minutes at 120 degrees Celsius, an anode active material 2-surface coated part is formed. It is to be noted that an anode active material non-coated part is provided where anode active material is not coated on one end of the anode.

<Preparation of Electrolytic Solution>

A description is given concerning preparation of electrolytic solution. A mixture is prepared of carbonate non-aqueous electrolyte of 99 parts by mass formed of ethylene carbonate (EC)/diethyl carbonate (DEC)=30/70 (volume ratio), and vinylene carbonate of 1 part by mass (content ratio of vinylene carbonate: 1% by mass). Additionally. $LiPF_6$ at a concentration of 1.0 moles/l is dissolved as a supporting salt, in this mixture, to obtain the electrolyte solution.

Figure 12:
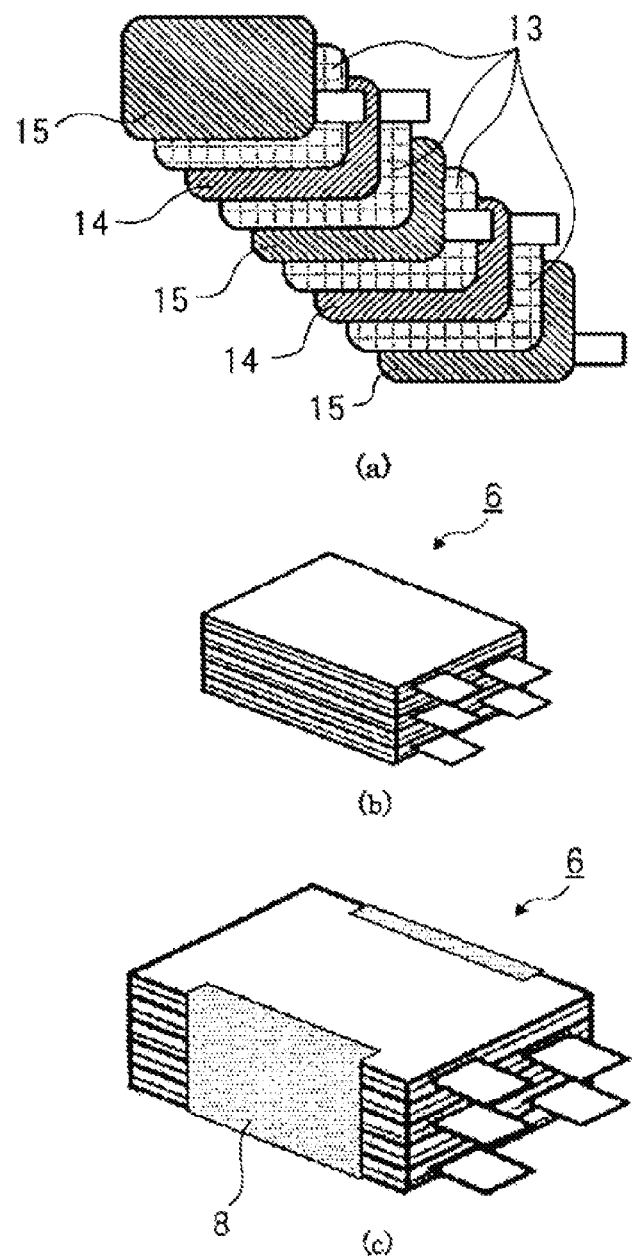
FIG. 12 is a schematic diagram for describing a method of manufacturing a lithium-ion battery in an example.
Figure 13:
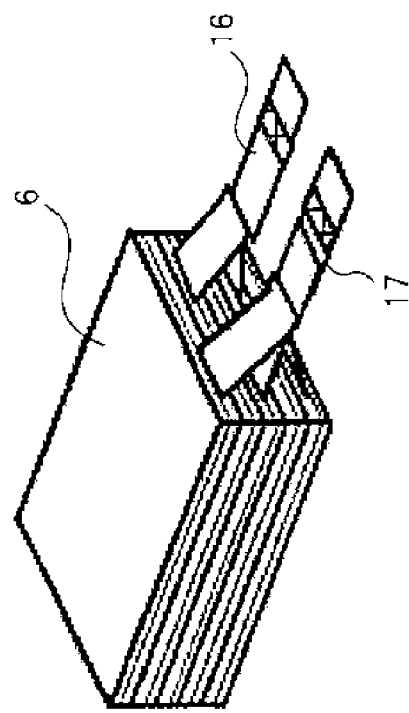
FIG. 13 is a schematic diagram for describing a method of manufacturing a lithium-ion battery in an example.
Figure 14:
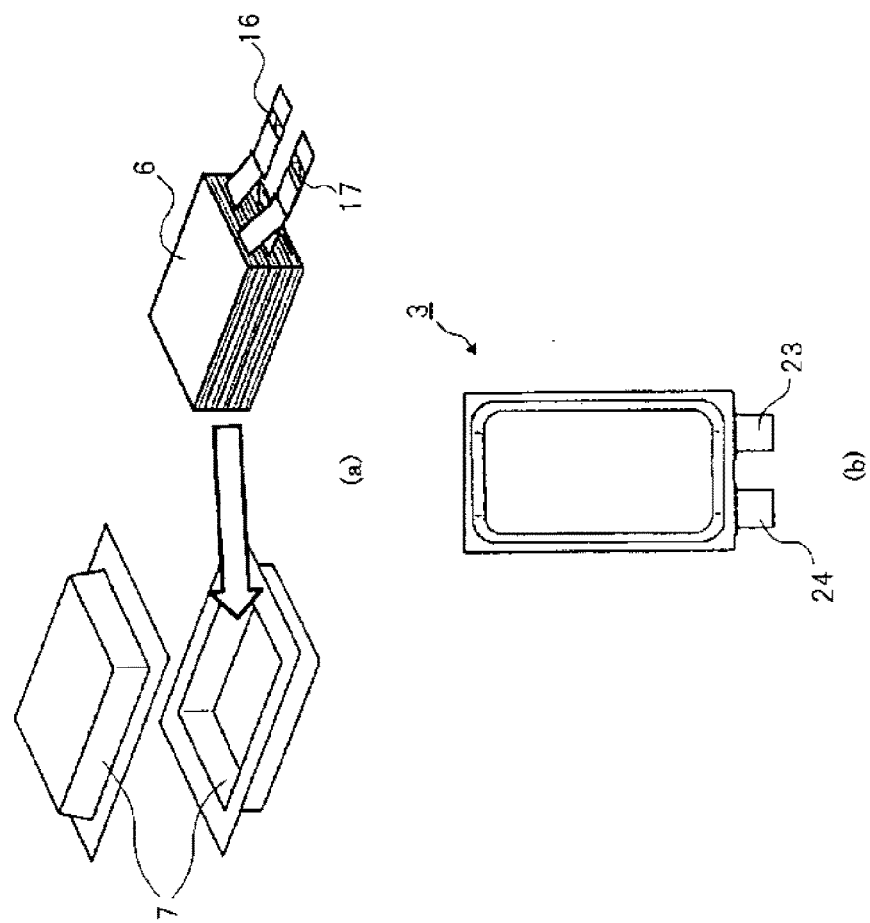
FIG. 14 is a schematic diagram for describing a method of manufacturing a lithium-ion battery in an example.

<Manufacture of Lithium-Ion Battery>
A description is given concerning manufacture of a lithium-ion battery. FIG. 12 to FIG. 14 are schematic diagrams for describing a method of manufacturing a lithium-ion battery. A laminated body 6 is fabricated (FIG. 12 B) by forming alternate layers (FIG. 12 A) of the above described fabricated cathode electrode 14 and the anode electrode 15 sandwiching a separator 13. The separator 13 is an insulation material such as polyolefin or the like, and has the same shape as the cathode electrode 14 and the anode electrode 15. The dimensions of the main surface of the laminated body 6 are 200 mm long and 100 mm wide. The laminated body 6 is formed by laminating 30 layers of the cathode electrode 14 and 31 layers of the anode electrode 15. A cathode current collector tab is connected to the cathode electrode 14. An anode current collector tab is connected to the anode electrode 15 (FIG. 12 B). The cathode current collector tabs and the anode current collector tabs, in a planar view, are drawn out from one side of the laminated body 6, and are layered so that they do not interfere with each other. On a pair of sides from which the cathode current collector tabs and the anode current collector tabs are not drawn out, a battery element fixing member 8 is arranged such that the cathode electrodes 14 and the anode electrodes 15 are held in alignment.

The plural cathode current collector tabs drawn out from one side of the laminated body 6 are bundled together, and the bundled cathode current collector tabs are connected to one end of a cathode terminal 16. In the same way, the plurality of anode current collector tabs are bundled together and connected to one end of an anode terminal 17 (FIG. 13). Resin coating is applied to a front surface and a back surface of the fabricated laminated body 6 which is accommodated in an exterior packaging 7 formed of flexible aluminum (FIG. 14 A). Another end of the cathode terminal 16 and another terminal of the anode terminal 17 are exposed to the outside of the exterior packaging 7. The other end of the cathode terminal 16 and the other end of the anode terminal 17 that are exposed to the outside of the exterior packaging 7 form a cathode terminal exposed part 23 and an anode terminal exposed part 24. Outside of an opening for injecting electrolyte solution, the surroundings of the exterior packaging 7 are sealed by heat sealing. Thereafter, electrolyte is injected to the inside of the exterior packaging 7 from the opening, the opening is sealed, and the lithium-ion battery 3 is manufactured (FIG. 14 B).

<Charging of Lithium-Ion Battery>
The lithium-ion battery fabricated as above is charged under conditions as described in Table 1, and charging time in a first constant current charging step and a second constant current charging step was measured. Confirmation was made as to the presence or absence of deposition of dangerous material. The deposition of dangerous material was confirmed by sight and by a safety test known as a nail penetration test. Charging is implemented under a condition of minus 10 degrees Celsius. In the lithium-ion battery used in charging, an adjustment is made to a voltage of 3V by discharge treatment. In the first constant current charging step, the lithium-ion battery was charged at a first current value until a first voltage value of 4.03 V was reached. Thereafter, the lithium-ion battery was charged at a second current value until a second voltage value of 4.10 V was reached. Thereafter, in a constant voltage step, the lithium-ion battery was charged at a second voltage value of 4.10 V until a charging rate corresponding to a charging current value reached 0.03 It. Results of Examples 1 to 8 are shown in Table 2.

In Table 1, values obtained by converting first current value to charging rate are shown as first charging rate. Values obtained by converting second current value to charging rate are shown as second charging rate. "Rate proportion" in Table 1 indicates values obtained by dividing the first charging rate value by the second charging rate value. The remaining battery capacity at the point in time at which the first constant current charging step is finished is shown as SOC (State of Charge). The SOC is the proportion of battery capacity with respect to the rated capacity of the battery. In Table 2, first charging time is the time required for the first constant current charging step. Second charging time is the time required for the second constant current charging step. Third charging time is the time required for the constant voltage charging step.

In Examples 1 to 8, deposition of dangerous material such as lithium or the like was not confirmed. Under the present conditions of implementation, in a case of charging to an upper limit voltage value with the first charging rate as it is, based on a rule of thumb it is considered that deposition of lithium is possible. However, in Examples 1 to 8, it is considered that dangerous material was not deposited because the charging current was lowered from the first charging rate to the second charging rate to charge up to the upper limit voltage value. According to Examples 1 to 8, it is considered that if the second charging rate is made not greater than 0.1 It, safety is increased. It is to be noted that a charging rate where dangerous material is not deposited is not limited to this range.

In Examples 1 to 8, it was possible to have total charging time of approximately 8 hours. Under the present conditions of implementation, in a case of charging to an upper limit voltage value from a charging start with the second charging rate as it is, it is considered that the total charging time greatly exceeds 8 hours. However, since charging is started at the first charging rate that is higher than the second charging rate, it is considered that the total charging time could be shortened. According to Examples 1 to 8, it was possible to curb the total charging time to 8.2 hours or less by having the charging rate not less than 1.3 and not greater than 6.4, and it was possible to have the total charging time not greater than 8.2 hours by having the charging rate not less than 1.6 and not greater than 5.8. It is considered that the charging time in Example 7 is longer than in Examples 1 to 6 because the first charging rate was lower than in Examples 1 to 6. It is considered that the charging time in Example 8 is longer than in Examples 1 to 6 because, since the first charging rate is higher than in Examples 1 to 6, voltage drop when switching from the first constant current charging step to the second constant current charging step increased, and this increase required time to supplement the second charging rate.

It is to be noted that in Examples 1 to 8, the voltage value for switching from the first constant current charging step to the second constant current charging step was set to 4.03 V, but the switching voltage value is not limited to this voltage value.

In a case where the remaining battery capacity (SOC), when the first constant current charging step is finished, is not less than 21% and not greater than 66%, the total charging time could be curbed to 8.2 hours or less, and in a case where the SOC is not less than 27% and not greater than 63%, the total charging time could be made less than 8 hours.

A time period with low power unit price is often set at 8 hours (for example, from 11 PM to 7 AM). Therefore, according to Examples 1 to 8, it is possible to practically complete the charging in the time period with low power unit price, and it is possible to reduce power cost.

TABLE 1

|  | First Charging Rate (It) | Second Charging Rate (It) | Rate proportion | SOC (%) |
|---|---|---|---|---|
| Example 1 | 0.19 | 0.08 | 2.4 | 60 |
| Example 2 | 0.26 | 0.08 | 3.3 | 55 |
| Example 3 | 0.42 | 0.08 | 5.3 | 41 |
| Example 4 | 0.16 | 0.10 | 1.6 | 63 |
| Example 5 | 0.32 | 0.10 | 3.2 | 49 |
| Example 6 | 0.58 | 0.10 | 5.8 | 27 |
| Example 7 | 0.13 | 0.10 | 1.3 | 66 |
| Example 8 | 0.64 | 0.10 | 6.4 | 21 |

TABLE 2

|  | First charging time (period) | Second charging time (period) | Third charging time (period)) | Total charging time (period) | Dangerous material deposition |
|---|---|---|---|---|---|
| Example 1 | 2.9 | 3.5 | 1.4 | 7.7 | None |
| Example 2 | 2.0 | 4.2 | 1.4 | 7.5 | None |
| Example 3 | 0.9 | 5.7 | 1.4 | 7.9 | None |
| Example 4 | 3.6 | 2.3 | 1.5 | 7.4 | None |
| Example 5 | 1.4 | 3.6 | 1.5 | 6.5 | None |
| Example 6 | 0.4 | 5.7 | 1.5 | 7.7 | None |
| Example 7 | 4.7 | 2.0 | 1.5 | 8.2 | None |
| Example 8 | 0.3 | 6.2 | 1.5 | 8.1 | None |

The charging apparatus, the electricity storage system, the charging method and program of the present invention have been described based on the abovementioned exemplary embodiments, but there is no limitation to the abovementioned exemplary embodiments, and it goes without saying that various transformations, modifications and improvements of various disclosed elements (including respective elements of the respective claims, respective elements of the respective exemplary embodiments and examples, respective elements of the respective drawings, and the like) are possible within the scope of the entire disclosure of the present invention and based on fundamental technological concepts of the invention. Various combinations, substitutions and selections of various disclosed elements (including respective elements of the respective claims, respective elements of the respective exemplary embodiments and examples, respective elements of the respective drawings, and the like) are possible within the scope of the entire disclosure of the present invention.

Further issues, objects and extended modes of the present invention will be evident from the entire disclosed matter of the invention including the scope of the claims.

With regard to numerical ranges described in the present description, arbitrary numerical values and small ranges included in the relevant ranges should be interpreted to be specifically described even where there is no particular description thereof.

Some or all of the abovementioned exemplary embodiments may also be described as in the following modes, but there is no limitation to the following descriptions.

<First Mode>

A charging apparatus comprising: a charge control unit, wherein the charge control unit charges a secondary battery at a first current value until the voltage of the secondary battery reaches a predetermined first voltage value, and the charge control unit, on detecting that the voltage has reached the first voltage value, performs control to charge the secondary battery at a second current value that is lower than the first current value, until a predetermined second voltage value is reached.

<Second Mode>

The charging apparatus, wherein the secondary battery is a lithium-ion battery, and the first voltage value is not less than 3.80 V and not greater than 4.05 V.

<Third Mode>

The charging apparatus comprising: a charge control unit, wherein the charge control unit charges a secondary battery at a first current value until a battery capacity of the secondary battery reaches a predetermined first capacity value, and the charge control unit, on detecting that the battery capacity has reached the first capacity value, performs control to charge the secondary battery at a second current value that is lower than the first current value, until a voltage of the secondary battery reaches a predetermined charging voltage value.

<Fourth Mode>

The charging apparatus, wherein the first capacity value is not less than 20% and not greater than 67%.

<Fifth Mode>

The charging apparatus, wherein the charge control unit, in response to detecting that the voltage has reached the second voltage value or the charging voltage value, charges the secondary battery at the second voltage value or the charging voltage value until the charging current value reaches a predetermined third current value.

<Sixth Mode>

The charging apparatus, wherein a value obtained by dividing the first current value by the second current value is not less than 1.4 and not greater than 6.5.

<Seventh Mode>

The charging apparatus, wherein the second current value is a current value corresponding to a charging rate not greater than 0.18 It.

<Eighth Mode>

The charging apparatus, wherein the first current value is a current value corresponding to a charging rate not less than 0.1 It and not greater than 0.6 It.

<Ninth Mode>

The charging apparatus, further comprising a temperature detection unit that detects a temperature related to the secondary battery, wherein the charge control unit controls charging of the secondary battery in response to temperature information from the temperature detection unit that has detected a temperature not greater than zero degrees Celsius.

<Tenth Mode>

The charging apparatus, wherein the temperature is at least one of a temperature of any part of the secondary battery, a temperature of an environment in which the secondary battery is placed, and a temperature of an environment in which the charging apparatus is placed.

<Eleventh Mode>

The charging apparatus, wherein the secondary battery is a lithium-ion battery.

<Twelfth Mode>

An electricity storage system comprising: the charging apparatus of the first to eleventh modes; and the secondary battery that is connected to the charging apparatus.

<Thirteenth Mode>

The electricity storage system further comprising a temperature sensor that is connected to the charging apparatus, and that detects a temperature related to the secondary battery.

<Fourteenth Mode>

The electricity storage system further comprising a battery management unit that manages charging and discharging of the secondary battery, wherein the battery management unit comprises the charging apparatus.

<Fifteenth Mode>

The electricity storage system further comprising: a power conditioner for connecting the secondary battery and a charging power supply; and a system controller that controls the battery management unit and the power conditioner, wherein the battery management unit, the power conditioner and the system controller are connected to each other.

<Sixteenth Mode>

A program that operates the charging apparatus described in the modes.

<Seventeenth Mode>

A charging method, comprising: charging a secondary battery at a first current value until the voltage of the secondary battery reaches a predetermined first voltage value; and charging the secondary battery at a second current value that is lower than the first current value, until the voltage reaches a predetermined second voltage value from the first voltage value.

<Eighteenth Mode>

The charging method, wherein the secondary battery is a lithium-ion battery, and the first voltage value is not less than 3.80 V and not greater than 4.05 V.

<Nineteenth Mode>

A charging method, comprising: charging a secondary battery at a first current value until a battery capacity of the secondary battery reaches a predetermined first capacity value; and charging the secondary battery at a second current value that is lower than the first current value, until the voltage of the secondary battery reaches a predetermined second voltage value from a first voltage value of the secondary battery corresponding to a state where the battery capacity has reached the first capacity value.

<Twentieth Mode>

The charging method, wherein the first capacity value is not less than 20% and not greater than 67%.

<Twenty-first Mode>

The charging method further comprising charging the secondary battery at the second voltage value until a charging current is not greater than a predetermined first current value, in a state where the voltage has reached the second voltage value.

<Twenty-second Mode>

The charging method, wherein a value obtained by dividing the first current value by the second current value is not less than 1.4 and not greater than 6.5.

<Twenty-third Mode>

The charging method, wherein the second current value is a current value corresponding to a charging rate not greater than 0.18 It.

<Twenty-fourth Mode>

The charging method, wherein the first current value is a current value corresponding to a charging rate not less than 0.1 It and not greater than 0.6 It.

<Twenty-fifth Mode>

The charging method, wherein the charging method is performed where a temperature related to the secondary battery is in a temperature range not greater than zero degrees Celsius.

<Twenty-sixth Mode>

The charging method, wherein the temperature is at least one of a temperature of any part of the secondary battery, a temperature of an environment in which the secondary battery is placed, and a temperature of an environment in which the charging apparatus that charges the secondary battery is placed.

<Twenty-seventh Mode>

The charging method, wherein the secondary battery is a lithium-ion battery.

<Twenty-eighth Mode>

A program that controls the charging method described in the modes.

<Twenty-ninth Mode>

An automobile comprising the charging apparatus according to the modes.

<Thirtieth Mode>

The automobile comprising the electricity storage system according to the modes.

<Thirty-first Mode>

An electrical motor comprising the charging apparatus according to the modes.

<Thirty-second Mode>

The electrical motor comprising the electricity storage system according to the modes.

<Thirty-third Mode>

A mobile apparatus comprising the charging apparatus according to the modes.

<Thirty-fourth Mode>

A mobile apparatus comprising the electricity storage system according to the modes.

<Thirty-fifth Mode>

A mobile apparatus comprising the charging apparatus according to the modes.

<Thirty-sixth Mode>

A mobile power supply comprising the electricity storage system according to the modes.

The charging apparatus, the electricity storage system, the charging method and the program of the present invention may be preferably applied to charging of a secondary battery, and in particular a lithium-ion battery. The invention may be preferably applied, for example, to an automobile, a mobile apparatus, an electrical motor, a mobile power supply or the like, in which a secondary battery is installed.

3 lithium-ion battery
6 laminated body
7 exterior packaging
8 battery element fixing member
13 separator
14 cathode electrode
15 anode electrode
16 cathode terminal
17 anode terminal
23 cathode terminal exposed part
24 anode terminal exposed part
100, 200, 300 charging apparatus
101 charge control unit
102 temperature detection unit
103 connection detection unit
104 voltage detection unit
105 temperature range determination unit
106 voltage setting unit
107 voltage comparison unit
108 storage unit
109 battery capacity calculation unit
110 battery capacity comparison unit
400, 500, 600 electricity storage system
401 secondary battery
402 temperature sensor
403 battery management unit 404 power conditioner
405 system controller

The invention claimed is:
1. A charging apparatus, comprising:
a charge control unit, wherein
the charge control unit charges a lithium-ion secondary battery at a first current value until voltage of the lithium-ion secondary battery reaches a predetermined first voltage value, and
the charge control unit, on detecting that the voltage has reached the first voltage value, performs control to charge the lithium-ion secondary battery at a second current value that is lower than the first current value, until a predetermined second voltage value is reached; and
a temperature detection unit that detects a temperature related to the lithium-ion secondary battery, wherein
in a state where a temperature from the temperature detection unit is within a first temperature range with at least a condition where a temperature is less than zero degrees Celsius, the charge control unit charges the lithium-ion secondary battery at the first current value until voltage of the lithium-ion secondary battery reaches the predetermined first voltage value, and charges the lithium-ion secondary battery at the second current value until the predetermined second voltage value is reached.
2. The charging apparatus according to claim 1, wherein the first voltage value is not less than 3.80 V and not greater than 4.05 V.
3. A charging apparatus, comprising:
a charge control unit, wherein
the charge control unit charges a lithium-ion secondary battery at a first current value until a battery capacity of the lithium-ion secondary battery reaches a predetermined first capacity value, and
the charge control unit, on detecting that the battery capacity has reached the first capacity value, performs control to charge the lithium-ion secondary battery at a second current value that is lower than the first current value, until a voltage of the lithium-ion secondary battery reaches a predetermined charging voltage value; and
a temperature detection unit that detects a temperature related to the lithium-ion secondary battery, wherein
in a state where a temperature from the temperature detection unit is within a first temperature range with at least a condition where a temperature is less than zero degrees Celsius, the charge control unit charges the lithium-ion secondary battery at the first current value until voltage of the lithium-ion secondary battery reaches the predetermined first voltage value, and charges the lithium-ion secondary battery at the second current value until the predetermined second voltage value is reached.
4. The charging apparatus according to claim 3, wherein the first capacity value is not less than 20% and not greater than 67%.
5. The charging apparatus according to claim 1, wherein the charge control unit, in response to detecting that the voltage has reached the second voltage value or the charging voltage value, charges the lithium-ion secondary battery at the second voltage value or the charging voltage value until a charging current value reaches a predetermined third current value.

6. The charging apparatus according to claim 1, wherein a value obtained by dividing the first current value by the second current value is not less than 1.4 and not greater than 6.5.
7. The charging apparatus according to claim 1, wherein the second current value is a current value corresponding to a charging rate not greater than 0.18 It.
8. The charging apparatus according to claim 7, wherein the first current value is a current value corresponding to a charging rate not less than 0.1 It and not greater than 0.6 It.
9. The charging apparatus according to claim 1, wherein the temperature is at least one of a temperature of any part of the lithium-ion secondary battery, a temperature of an environment in which the lithium-ion secondary battery is placed, and a temperature of an environment in which the charging apparatus is placed.
10. An electricity storage system, comprising:
the charging apparatus according to claim 1; and
the lithium-ion secondary battery that is connected to the charging apparatus.
11. The electricity storage system according to claim 10, further comprising:
a temperature sensor that is connected to the charging apparatus, and that detects a temperature related to the secondary battery.
12. The electricity storage system according to claim 10, further comprising:
a battery management unit that manages charging and discharging of the lithium-ion secondary battery, wherein
the battery management unit comprises the charging apparatus.
13. The electricity storage system according to claim 10, further comprising:
a power conditioner for connecting the lithium-ion secondary battery and a charging power supply; and
a system controller that controls the battery management unit and the power conditioner, wherein
the battery management unit, the power conditioner and the system controller are connected to each other.
14. A non-transitory computer-readable recording medium storing a program that operates the charging apparatus according to claim 1.
15. A charging method, comprising:
charging a lithium-ion secondary battery at a first current value until a voltage of the lithium-ion secondary battery reaches a predetermined first voltage value; and
charging the lithium-ion secondary battery at a second current value that is lower than the first current value, until the voltage reaches a predetermined second voltage value from the first voltage value, wherein
in a state where a temperature related to the lithium-ion secondary battery is within a first temperature range with at least a condition where a temperature is less than zero degrees Celsius, charging a lithium-ion secondary battery at a first current value is performed until a voltage of the lithium-ion secondary battery reaches the predetermined first voltage value, and charging the lithium-ion secondary battery at the second current value is performed until the voltage reaches the predetermined second voltage value from the first voltage value.
16. The charging method according to claim 15, wherein the first voltage value is not less than 3.80 V and not greater than 4.05 V.
17. The charging method according to claim 15, further comprising:

charging the lithium-ion secondary battery at the second voltage value until a charging current is not greater than a predetermined first current value, in a state where the voltage has reached the second voltage value.

18. A non-transitory computer-readable recording medium storing a program that controls the charging method according to claim 15.

* * * * *